United States Patent [19]

Ishikawa et al.

[11] Patent Number: 5,074,168
[45] Date of Patent: Dec. 24, 1991

[54] HYDRAULIC CONTROL DEVICE FOR AN AUTOMATIC TRANSMISSION

[75] Inventors: Kazunori Ishikawa, Toyota; Takuji Taniguchi, Okazaki; Kunihiro Iwatsuki, Aichi; Yutaka Taga, Aichi, all of Japan

[73] Assignees: Aisin AW Co., Ltd.; Toyota Jidosha Kabushiki Kaisha, both of Japan

[21] Appl. No.: 407,669

[22] Filed: Sep. 14, 1989

[30] Foreign Application Priority Data

Sep. 16, 1988 [JP] Japan ................................ 63-231775

[51] Int. Cl.⁵ ............................................ B60K 41/06
[52] U.S. Cl. ........................................ 74/878; 74/866
[58] Field of Search ................. 74/866, 867, 868, 869, 74/878

[56] References Cited

U.S. PATENT DOCUMENTS

| 3,937,107 | 2/1976 | Lentz | 74/868 X |
|---|---|---|---|
| 4,033,203 | 7/1977 | Hirosawa et al. | 74/869 |
| 4,134,313 | 1/1979 | Ishikawa | 74/867 |
| 4,136,584 | 1/1974 | Ishikawa | 74/867 |
| 4,307,631 | 12/1981 | Iwanaga et al. | 74/878 X |
| 4,488,457 | 12/1984 | Nishimura et al. | 74/878 X |
| 4,744,269 | 5/1988 | Greene et al. | 74/868 |
| 4,792,901 | 12/1988 | Mack et al. | 74/866 X |
| 4,827,807 | 5/1989 | Hayakawa et al. | 74/878 X |
| 4,920,829 | 5/1990 | Takada et al. | 74/868 |

FOREIGN PATENT DOCUMENTS 60-37446 2/1985 Japan .

Primary Examiner—Dwight Diehl
Attorney, Agent, or Firm—Lorusso & Loud

[57] ABSTRACT

A reverse-engaging condition is prevented by a reverse inhibit valve operated by the solenoid valve even if a shift lever is operated to a reverse range at forward running. A solenoid valve controlling a 1-2 shift valve is "OFF" when controlling a manual valve to a reverse range under 7 km/h of a vehical speed. The reverse inhibit valve is at a right-half position. Therefore, the hydraulic pressure from the reverse range port of the manual valve runs through oil passages and supplied to the hydraulic servos. At forward running over 7 km/h the solenoid valve is switched "ON", the reverse inhibit valve is switched to a left-half position and oil passages are isolated. When the solenoid valve is switched at forward running, a hydraulic pressure from a R range port of the manual valve does not operate on a difference of cross sectional areas of lands of the reverse inhibit valve, so that the reverse inhibit valve is kept at the right-half position together with a pressing force of a spring therein.

20 Claims, 6 Drawing Sheets

| POSITION | | SOLENOID | | | CLUTCH | | | BRAKE | | | | ONE-WAY CLUTCH | | |
|---|---|---|---|---|---|---|---|---|---|---|---|---|---|---|
| | | 81 | 5 | 43 | $C_1$ | $C_2$ | $C_0$ | $B_1$ | $B_2$ | $B_3$ | $B_0$ | $F_1$ | $F_2$ | $F_0$ |
| P | | O(x) | X | X | X | X | O | X | X | X | X | X | X | X |
| R | | O(x) | X | X | X | O | O | X | X | O | X | X | X | O |
| R (V≧7) | | O(x) | O | X | X | X | O | X | X | X | X | X | X | O |
| N | | O(x) | X | X | X | X | O | X | X | X | X | X | X | X |
| D | 1ST | O | X | X | O | X | O | X | X | X | X | X | ⊗ | O |
| | 2ND | O | O | ◉ | O | X | O | X | O | X | X | ⊗ | X | O |
| | 3RD | X | O | ◉ | O | O | O | X | O | X | X | X | X | O |
| | 4TH | X | X | ◉ | O | O | X | X | O | X | O | X | X | X |
| 2 | 1ST | O | X | X | O | X | O | X | X | X | X | X | ⊗ | O |
| | 2ND | O | O | ◉ | O | X | O | O | O | X | X | O | X | O |
| | 3RD | X | O | ◉ | O | O | O | X | O | X | X | X | X | O |
| | (3RD) | X | X | X | O | O | O | X | O | X | X | X | X | O |
| L | 1ST | O | X | X | O | X | O | X | X | O | X | X | O | O |
| | 2ND | O | O | X | O | X | O | O | O | X | X | O | X | O |
| | (1ST) | X | X | X | O | X | O | X | X | O | X | X | O | O |

| | | | |
|---|---|---|---|
| O | ON | E ENGAGE | LOCK |
| X | OFF | RELEASE | FREE |
| ◉ | ON·L·UP·ON / OFF·L·UP·OFF | — | — |
| ⊗ | — | — | FREE AT COASTING |

REMARKS

FIG. 6

HYDRAULIC CONTROL DEVICE FOR AN AUTOMATIC TRANSMISSION

BACKGROUND OF THE INVENTION

1. Field of the Invention

This invention relates to a hydraulic control device for an automatic transmission to be mounted on an automobile and, more specifically, to a reverse engage preventing device operative in forward running which prevents reverse-engagement even when a shift lever is placed in reverse range in forward driving.

2. Description of the Prior Art

In general, one prior art system employs a designated solenoid valve and another additionally utilizes a 1-2 shift valve as the reverse engage preventing device in forward running.

The system using the designated solenoid valve requires many expensive solenoid valves, which increase the cost of an automatic transmission and decrease reliability.

In the system additionally using the 1-2 shift valve the operating frequency of the 1-2 shift valve increases, so that undesirable valve-sticking may occur.

SUMMARY OF THE INVENTION

The objective of this invention is to provide a reverse engage preventing device which does not use many expensive solenoid valves, utilizes a valve which operates only at required moment to prevent reverse engaging in forward running, prevents occurrence of valve-stick and is reliable and low cost.

This invention, as shown in FIG. 1 or FIG. 5, includes automatic transmission (7) with hydraulic servos (C1), (C2), (C0), (B1) and (B2) each arranged for operating a frictional engaging element which, in turn, engages a predetermined element of a transmission gear mechanism (1). Also included are plural shift valves (2), (4) and so on which control hydraulic pressure for operating each hydraulic servo, a solenoid valve (5) and so on controlling the shift valves and a manual valve (6).

A hydraulic control device for an automatic transmission (7) reverse inhibit valves (9), (9') in oil passages (t) and (u) which connect a reverse range port (d) of the manual valve (6) to hydraulic pressure servos (C2) and (B3) for a frictional engaging element which engages in reverse. Also in the hydraulic control device, a control pressure from the solenoid valve (5) operates on the inhibit valves (9), (9') and against the hydraulic pressure from a reverse range port (d) or a D range port (a) both of which are associated with the manual valve (6). So the inhibit valves (9), (9') connect the oil passages (t) and (u) only when the manual valve (6) is in reverse range (R) and control pressure is received from the solenoid valve (5).

Furthermore, when a speed sensor (15) signals an "ON" state continuously for a certain time to the solenoid valve (5) while sensing a speed lower than a certain measure, a signal comes from a controlling section (C), so that an alarm device (17) starts operating.

Based on the above structure when the manual valve (6) is placed in reverse range (R), if the vehicle speed (V) does not exceed a certain speed for example 7 km/h, the solenoid valve (5) is kept "OFF". Under these conditions, as the control pressure operates on the reverse inhibit valve (9) or (9'), the spool (9a) or (9'a) is moved to a position where oil passages (t) and (u) connect. By this action the hydraulic pressure is fed to hydraulic servos (C2) and (B3) in order to engage frictional engaging elements (C2) and (B3), which are responsive to the pressure. Therefore the transmission gear mechanism (1) is switched to reverse.

At a certain vehicle speed for example above 7 km/h, if the manual valve is placed in reverse (R), the solenoid valve (5) is switched "ON" and the control pressure is not transmitted to the reverse inhibit valve (9), (9') but the hydraulic pressure from the reverse range port (d) or the D-range port (a) of the manual valve (6) is received by the valve (9),(9') so the inhibit valve (9) or (9') isolates the oil passage (t) from (u). Therefore the hydraulic pressure is not fed to the hydraulic servos for the frictional engaging elements and the transmission gear mechanism (1) is not switched to reverse.

In forward driving the solenoid valve (5) is switched from "ON" to "OFF" (for example 3 to 4 speed) or from "OFF" to "ON" (for example 1 to 2 speed) in shifting to a certain range. In the state shown in FIG. 1 because the hydraulic pressure from a R range port (d) of the manual valve (6) does not work on the land differential part of the spool (9'a), the valve (9') is kept at right-half-position with no regard to supplying and draining of the controlling pressure by the switching of the solenoid valve (5). Also, for example as in the embodiment shown in FIG. 5, the hydraulic pressure is supplied from a D range port (a) to the oil chamber (9b) of the inhibit valve (9) and the right-half-position is kept. The valve (9) is kept at the right-half-position with no regard to whether the hydraulic pressure from the solenoid valve (5) is supplied to the controlling chamber (q) or not.

BRIEF DESCRIPTION OF THE DRAWINGS

In the drawings:

FIG. 6 is a table of operation of solenoid valves, clutches, brakes and one-way clutches at each position.

DETAILED DESCRIPTION OF THE PREFERRED EMBODIMENTS

Figure 1:
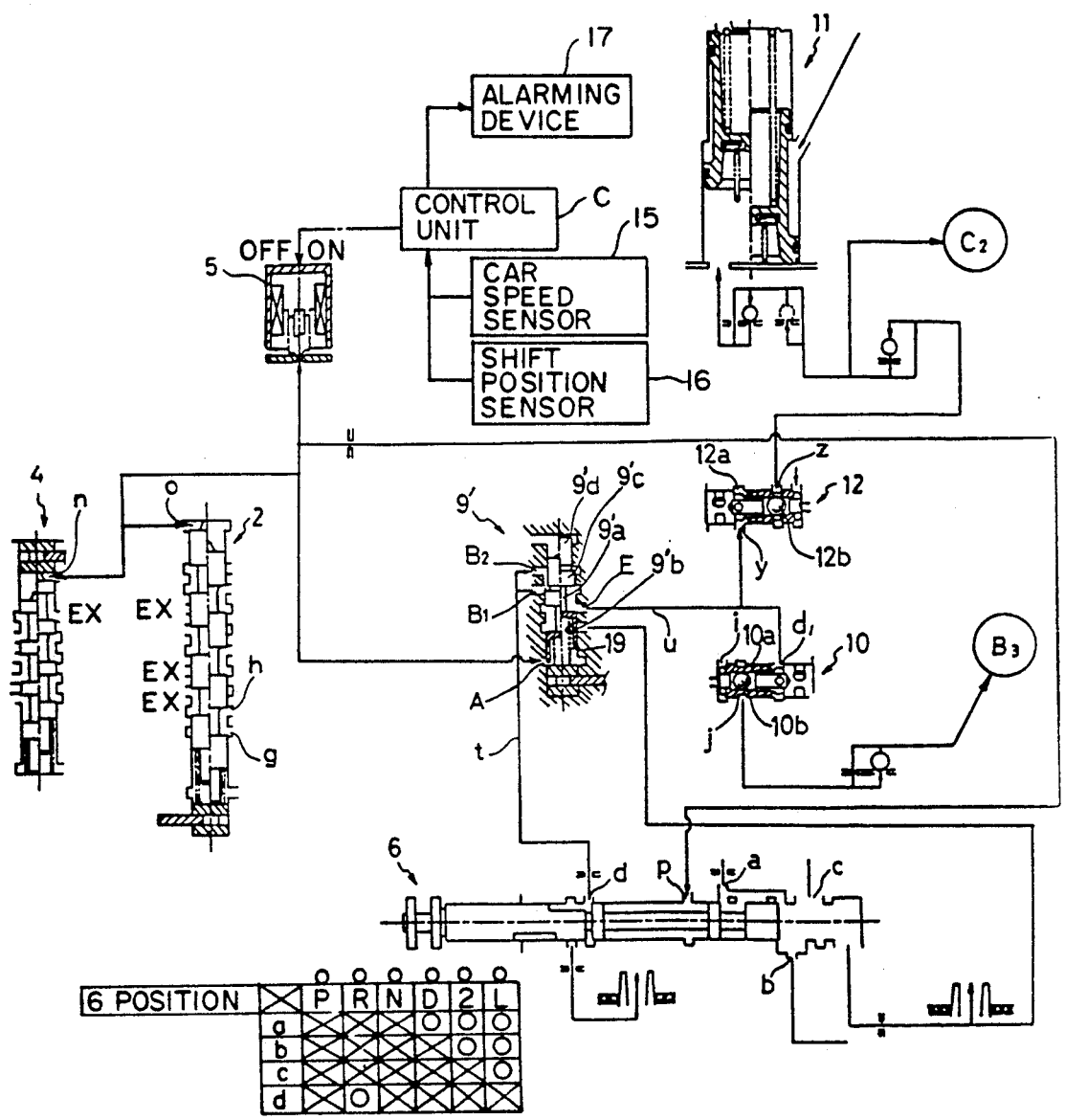
FIG. 1 is a hydraulic control circuit diagram of a reverse engage preventing device for an automatic transmission relating to this invention.

An embodiment of this invention will now be described with reference to the drawing figures.

Figure 2:
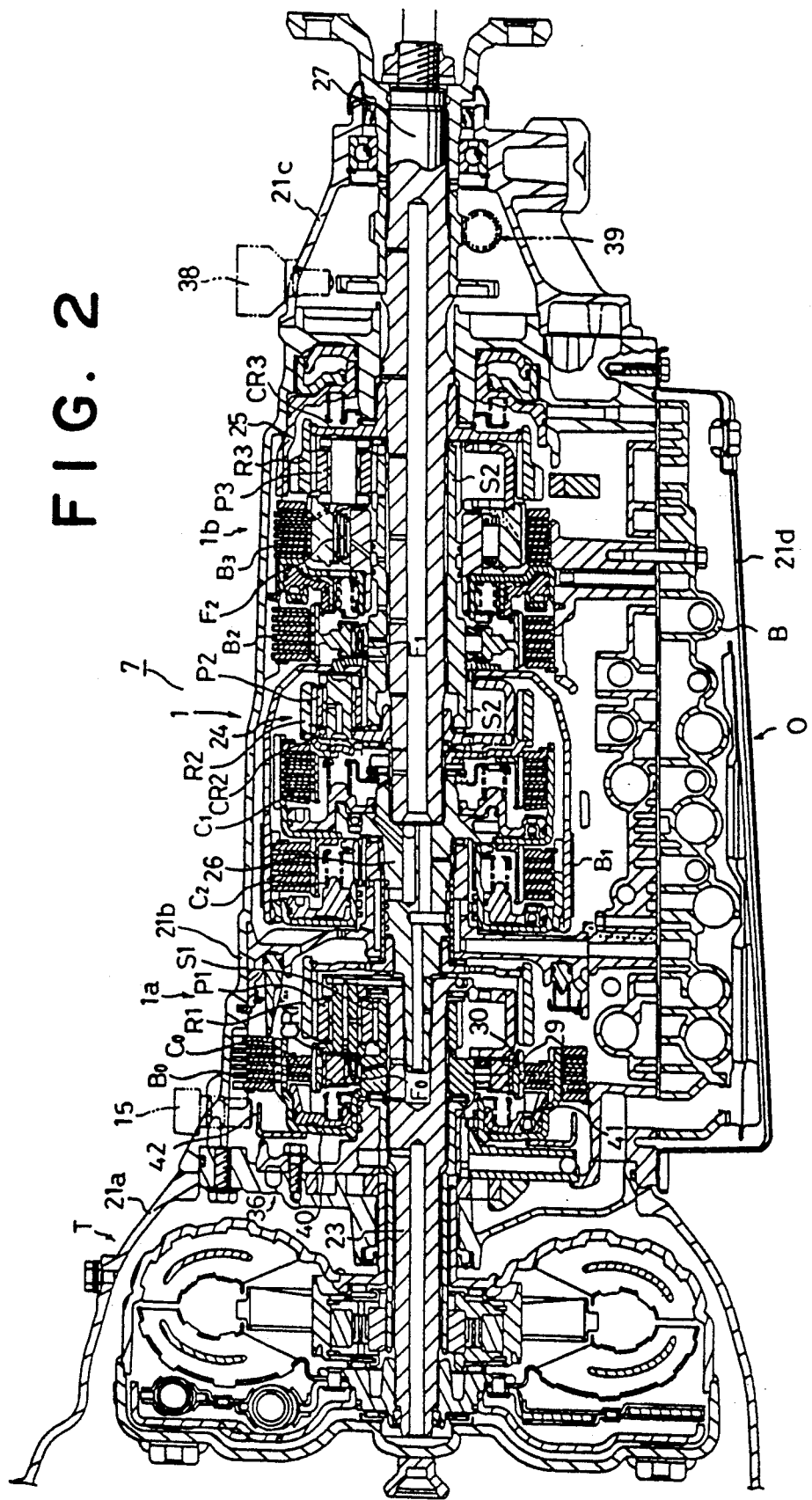
FIG. 2 is a total cross sectional view of the automatic transmission to which this invention is applied.
Figure 3:
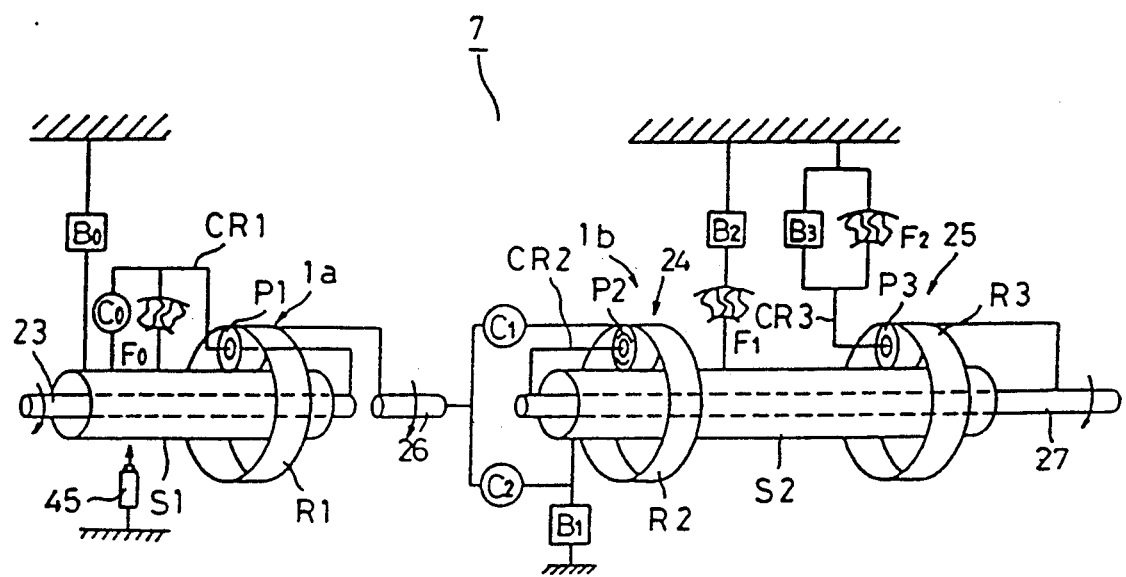
FIG. 3 is a schematic outlining the structure of the automatic transmission.

An automatic transmission 7, as shown in FIG. 2 and FIG. 3, includes a torque convertor T, a planetary transmission gear mechanism 1 and a hydraulic control device 0, all of which are mounted, respectively, in a converter housing 21a, a transmission case 21b and an extension housing 21c, and valve body B and an oil pan 21d.

The transmission gear mechanism 1 is composed of an overdrive planetary gear unit 1a and a main transmission unit 1b formed of a front planetary gear a unit 24 and a rear planetary gear unit 25. The over-drive planetary gear unit 1a has a carrier CR1 which is connected directly to an input shaft 23 and which supports a planetary pinion P1, a sun gear S1 enclosing the input shaft 23 and a ring gear R1 connecting to an input shaft of the main transmission unit 1b. Between the planetary carrier CR1 and the sun gear S1 an over-drive direct clutch C0 and a one-way clutch F0 are arranged, and between the sun gear S1 and the case 21b an over-drive brake B0 is arranged. The front planetary gear unit 24 is composed of a carrier CR2 connecting directly to an output shaft 27 and supporting a planetary pinion P2, a sun gear S3 enclosing by the output shaft 27 and formed integrally with the sun gear S2 of the planetary gear unit 25 and a ring gear R2 connecting to an input shaft 26 through a forward clutch C1. A direct clutch C2 is arranged between the input shaft 26 and the sun gear S3, which a 2nd coast brake B1 is arranged between the sun gear S2 and the case 21b. Furthermore, between the sun gear S3 and the case 21b a 2nd coast brake B2 made up by multi-plates is arranged through a one-way clutch F1. The rear planetary gear unit 25 is composed of a carrier CR3 supporting a planetary pinion P3 and a ring gear R3 directly connecting to the sun gear S2 and the output shaft 27. Between the carrier CR3 and the case 21b a 1st & Rev. brake B3 and a one-way clutch F2 are arranged parallelly. 36 in FIG. 2 is an oil pump, 38 an output shaft rotating sensor and 39 a rotation measuring gear for a speed meter. At an O/D planetary gear unit 1a a boss 29 of the sun gear S1 elongates axially, while the one-way clutch F0 is arranged between the boss section and a sleeve 30 fixed by the carrier CR1. A flange section 40 forming a cylinder elongates from a boss section 29a. The hydraulic actuator for C0 is constituted by the flange section 40 enclosing a piston 41. Furthermore the O/D direct clutch C0 is arranged between the flange inner surface and the sleeve 30. The O/D brake B0 is arranged between the outer surface of the flange section 40 and the case 21b. A circular-shaped brim section 42 is, elongating to the outer diameter direction, fixed on the flange section 40. A vehicle speed sensor 15 is a non-contact sensor such as light or magnetism is arranged in the case 21b. The sensor 15 senses the rotation speed of the brim section 42 integral to the input member 23 at the connecting of the O/D direct clutch C0 namely at the first, second and third speed.

The hydraulic pressure control device 0 will be explained along with FIG. 4.

Figure 4:
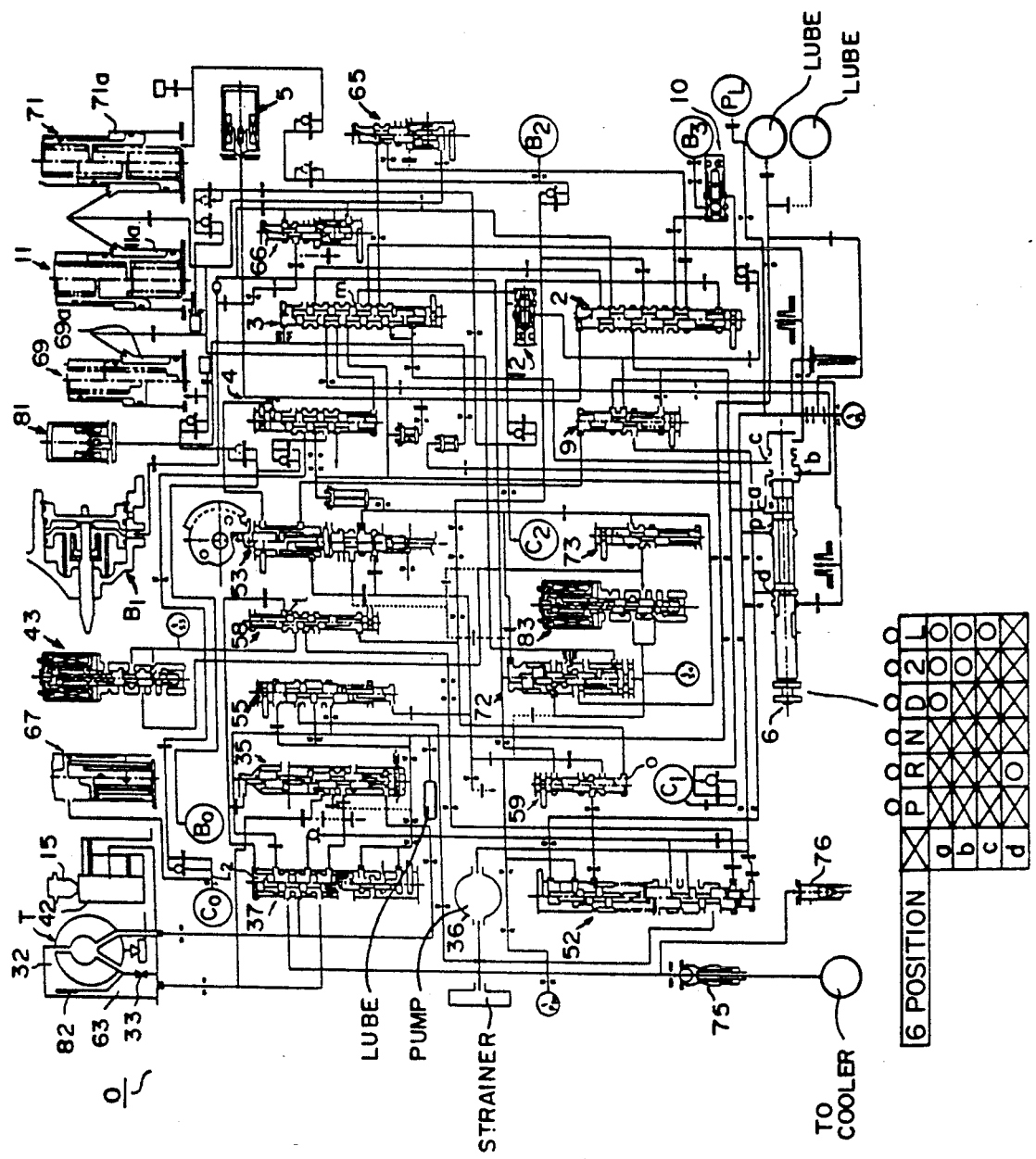
FIG. 4 is a hydraulic circuit diagram for the entire hydraulic control system.

C0, C1 and C2 in FIG. 4 show hydraulic servos of each clutch, and B0, B1, B2, B3 show hydraulic pressure servos of each brake, T a torque converter, 36 a hydraulic pressure pump and 15 a vehicle speed sensor. 6 is a manual valve. The manual valve has four ports a, b, c and d. The manual valve also has six positions R, P, N, D and L. A line pressure port p at each position connects to each port a, b, c and d which are shown as in FIG. 4. Furthermore 52 is a primary regulator valve, 53 a throttle valve, 55 a secondary regulator valve and 59 a cut-back valve.

2 is a 1-2 shift valve, 3 a 2-3 shift valve, 4 a 3-4 shift valve, 9 a reverse inhibit valve, 65 a low-coast modulator valve and 66 a second coast modulator valve. 67 is an accumulator for C0, 69 for B0, 11 for C2 and 71 for B2. 72 is an accumulator control valve to regulate a hydraulic pressure connecting to back pressure chambers 69a, 11a and 71a of the accumulator 69 for B0, the accumulator 11 for C2 and the accumulator 71 for B2. 75 is a cooler connecting pipe and 76 is a cooler bypass valve. Furthermore 81 and 5 are first and second solenoid valves for controlling shift valves 2, 3 and 4. 83 is a fourth solenoid valve composed of a linear solenoid valve and 83 regulates the hydraulic pressure from the solenoid regulator valve 73 at the required moment to supply the regulated hydraulic pressure to the accumulator control valve 72. 35 is a lock-up control valve, 37 a lock-up relay valve, 43 a third solenoid valve formed of a liner solenoid valve for controlling the lock up clutch and 58 a solenoid relay valve.

Figure 5:
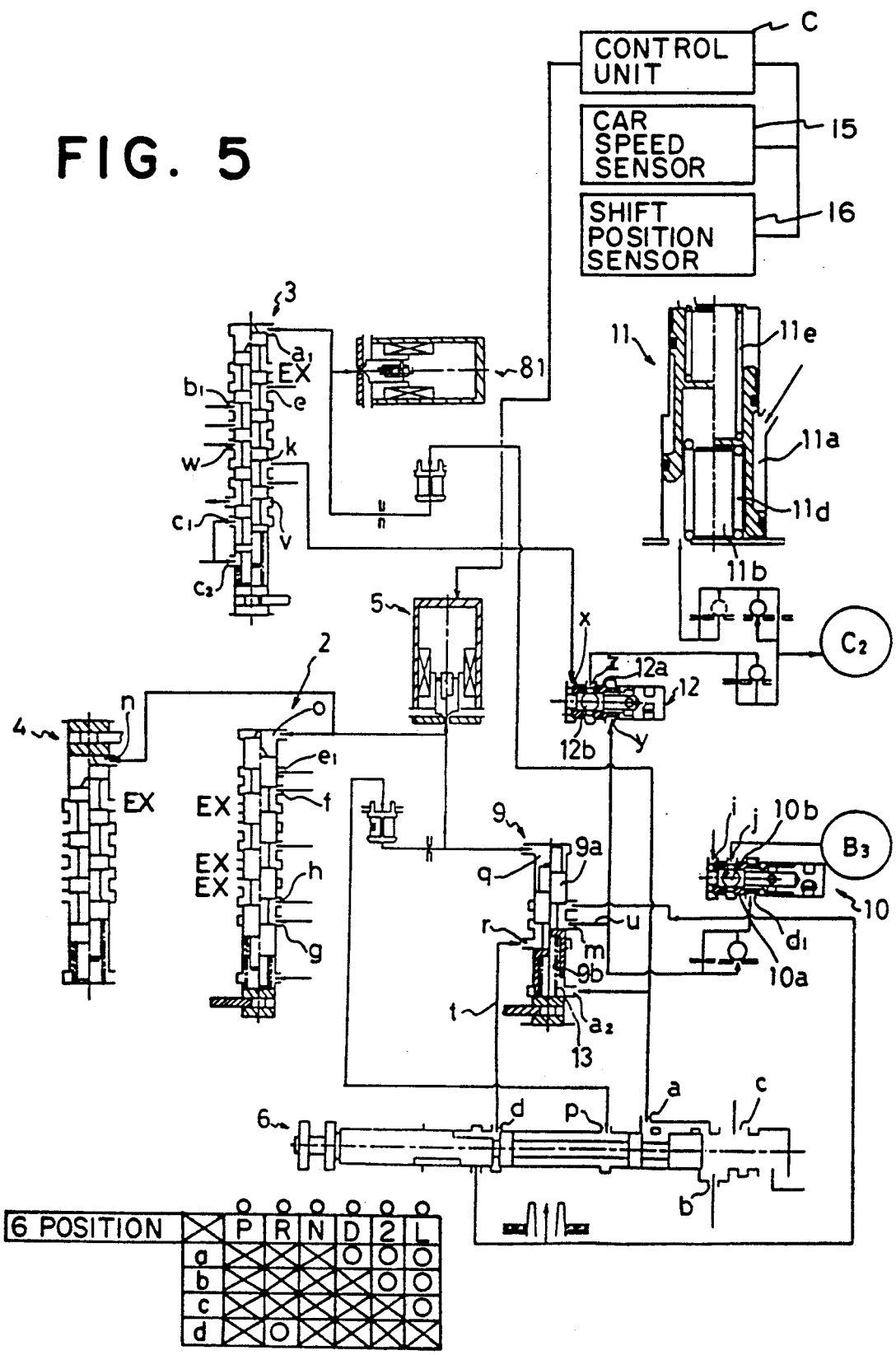
FIG. 5 is a view showing a reverse engage preventing device and is a hydraulic circuit diagram of an embodiment which differs from FIG. 1.

Reverse engagement prevention in forward running, which is the main of this invention shall be explained below with reference to FIG. 5.

The reverse engagement system for preventing a shift into reverse during forward running includes a reverse inhibit valve 9 which is shifted the required moment by the second solenoid valve 5 which also controls a 1-2 shift valve and a 3-4 shift valve. And the hydraulic pressure to both the hydraulic pressure servo C2 for the direct clutch and to the hydraulic pressure servo B3 for the 1st & Rev. brake is cut, so that a reverse engagement by erroneous shifting is precluded when the vehicle is running forward.

Hydraulic pressure from the port a, where line pressure p is available in D, 2 and L ranges of the manual valve 6, is supplied to a first solenoid valve 81 controlling oil pressure to chamber a1 of the 2-3 shift valve 3 and oil pressure to the port a2 of the reverse inhibit valve 9. Hydraulic pressure from the port b, where the line pressure p is supplied at 2 and L positions of the manual valve 6, is supplied to a port b1 of the 2-3 shift valve 3. Also hydraulic pressure is available at port c, where the line pressure p is supplied at the L position of the manual valve 6. Furthermore the 1-2 shift valve 2, where a port g and a port h are connected, is at right-half position in first speed. The hydraulic pressure from the port h is received at port i of a three-way check valve 10 and the hydraulic pressure is thereby led to the hydraulic pressure servo B3 for the 1st & Rev. brake through the check valve 10. The check ball valve 10 has a port d1 connecting to the port d when the line pressure p is supplied through the reverse inhibit valve 9 in the reverse position of the manual valve 6. The check valve 10 has a ball 10b which moves in a sleeve 10a responsive to the hydraulic pressure supplied from either of ports i and d1 and leads the hydraulic pressure to a port j and to the hydraulic pressure servo B3.

The 2-3 shift valve 3 is kept at the left-hand position at the third and fourth speed. A port w connects to a port k and the hydraulic pressure from the port k is led to a port x of a three-way-check valve 12. A port y of the check valve 12 connects to a port d of the manual valve 6 through the reverse inhibit valve 9. Based on the supplied hydraulic pressure from either of ports x and y a ball 12b in a sleeve 12a is moved and the pressure is led to a port z and to the hydraulic pressure servo C2 for the direct clutch. The check valve 10 and the check valve 12 for oil passage switching carry a ball inside in order to improve reliability.

The reverse inhibit valve 9 has a spool 9a and a spring 13. Beneath the spool 9a is an oil chamber 9b in which the spring 13 is mounted. Therefore when the hydraulic pressure is not received in chamber q, the spool 9a is kept at the right-half position by the pressing force of the spring 13. The reverse inhibit valve 9, whose top end defines a control chamber q where a hydraulic pressure is received when the second solenoid valve 5 is "OFF", has a port a2 which admits hydraulic pressure received from the port a of the manual valve 6 to the oil chamber 9b beneath the spool 9a. The reverse inhibit valve 9 has a port r connecting to the port d of the manual valve through an oil passage t. The reverse inhibit valve also has a port m which connects the hydraulic pressure servo B3 for the 1st & Rev. brake and the hydraulic pressure servo C2 for the direct clutch through an oil passage u and the check valves 10 and 12.

The accumulator 11 for the direct clutch C2 has accumulator chamber 11b and back pressure chamber 11a which is made comparatively small. Springs 11d and 11e are in compression and are arranged at both sides of the piston 11c. The accumulator chamber 11b connects to the hydraulic pressure servo C2 for the direct clutch through an orifice and a check valve. The accumulator chamber 11b connects to the port k of the 2-3 shift valve 3 or the port m of the reverse inhibit valve 9 through the check valve 12.

Furthermore the second solenoid valve 5 connects to a control chamber o of the 1-2 shift valve 2 and a control chamber n of the 3-4 shift valve 4 and also connects to the control chamber q of the reverse inhibit valve 9. The solenoid valve 5 drains when switched "ON" by signals from the control unit C based on a shift position sensor 16 and the vehicle speed sensor 15, and cuts off hydraulic pressure (control pressure) to the control chambers o, n and q. The solenoid valve 5 when "OFF" does not drain but, rather, supplied hydraulic pressure (control pressure) to the oil chambers o, n and q.

The operation of the embodiment shall now be explained. Each solenoid valve 81, 5 and 43, each clutch C0, C1 and C2, each brake B0, B1 and B3 and each one-way clutch F0, F1 and F2 is controlled at each transmission range P, R, R(v≧7), N, D, 2 and L as shown by the table of operation in FIG. 6.

In other words, the first solenoid valve 81 is "ON" at D or 2 range of first speed. As a result, the over-drive direct clutch C0, the one-way clutch F0, F2 and the forward clutch C1 are engaged, while the others are released. Therefore, the overdrive planetary gear unit 1a is integrally directly-connected through the clutch C0 and the one-way clutch F0. The rotation of the input shaft 23 is transmitted to the input shaft 26 of the main transmission unit 1b. In the main transmission unit 1b the rotation of the input shaft 26 is transmitted to the ring gear R2 of the front planetary gear unit 24 through the forward clutch C1, and furthermore transmitted to the carrier CR2 and to the output shaft 27 integral to the carrier CR2. The carrier CR3 of the rear planetary gear unit 25 is rotated in the left direction through the sun gear S2. This rotation is interrupted by the one-way clutch F2, so that the planetary pinion P3 rotates itself and transmits force to a ring gear R3 integral to the output shaft 27.

In the second speed of D range, in the second speed of 2 range, and in the second speed of L range, not only the first solenoid valve 81 is switched "ON" but also the second solenoid valve 5 is switched "ON", so that, for example, in the second speed of D range the over-drive direct clutch C0, the one-way clutch F0, the forward clutch C1, the one-way clutch F1 and the brake B2 are engaged and the others are released. As a result the over-drive planetary gear unit 1a is directly connected, and whole the rotation of the input shaft 23 is transmitted to the input shaft 26 of the main transmission unit 1b. At the main transmission unit 1b the rotation of the input shaft 26 is transmitted to the ring gear R2 of the front gear unit 24 through the forward clutch C1. Then the sun gear S2 is given a left direction rotation through a pinion P2. This rotation of the sun gear S2 is interrupted by the one-way clutch F1 responding to the engagement of the 2nd brake B2. Therefore, the planetary pinion P2 rotated itself, while the carrier CR2 rotates, and the second speed rotation is transmitted to the output shaft 27 only through the front gear unit 24.

At the third speed of D and 2 range the first solenoid 81 is switched "OFF" while the second solenoid valve 5 is switched "ON". By this action the over-drive direct clutch C0, the one-way clutch F0, the forward clutch C1, the direct clutch C2 and the 2nd brake B2 engage and the others are released. Therefore, the over-drive planetary gear unit 1a is directly connected. At the main transmission unit 1b, where the front planetary gear unit 24 is integral by the engagement of both clutches C1 and C2, the rotation of the input shaft 26 is transmitted to the output shaft 27.

At the fourth speed of D range namely the highest speed, the second solenoid valve 5 is switched "OFF" and the first solenoid valve 81 is also switched "OFF". The forward clutch C1, the direct clutch C2 and the 2nd brake B2 are engaged. The main transmission unit 1b is directly connected as the third speed. The over-drive planetary gear unit 1a is switched to release the direct clutch C0 and to engage the brake B0. Therefore, the sun gear S1 is locked by the brake B0. The carrier CR1 rotates and the planetary pinion P1 rotates itself to transmit force to the ring gear R1. This higher rotation (over-drive) is transmitted to the input shaft 26 of the main transmission unit 1b which is directly connected.

At the switching to a certain transmission speed state at forward running, the second solenoid valve 5 is switched either from "ON" to "OFF" or from "OFF" to "ON" to operate the shift valve 2 and 4. At this state, as the hydraulic pressure from the D range port a is supplied to the oil chamber 9b of the reverse inhibit valve 9, the valve 9 is kept to the right-half position with no regard to supplying and draining of the control pressure of the second solenoid valve 5, so that the oil passage t and the oil passage u are interrupted. So the condition that the hydraulic pressure from the reverse range port is not supplied either to the hydraulic pressure servo C2 for the direct clutch and or to the hydraulic pressure servo B2 for the 2nd coast brake. Therefore, at forward running the spool 9a of the reverse inhibit valve 9 does not move, so that the valve stick will not be occurred.

When the manual valve 6 is operated to the reverse range with the condition that the vehicle speed V of forward running is under 7 km/h, by the signals from the control unit C the first solenoid valve 81 is switched "ON", while the second solenoid valve 5 is switched "OFF", so that the control pressure is operated on the control chamber q of the reverse inhibit valve 9. As a result, a spool 9a where the hydraulic pressure from the port a does not operate and which is kept at the right-half position only by a pressing force of the spring 13 is moved to the left-half position by the control pressure. By this action the port r of the reverse inhibit valve 9 connects to the port m, and the hydraulic pressure from a port d of the manual valve 6 is supplied to the hydraulic pressure servo C2 for the direct clutch through the check ball 12. Therefore, 1st & Rev. brake B3 and the direct clutch C2 are engaged together with the one-way clutch F0 and the over-drive direct clutch C0, and the output shaft 27 rotates reversely.

Furthermore when the manual valve 6 is operated to the reverse range with the condition that a vehicle speed V of forward running is above 7 km/h, buy signals from the control unit C based on the vehicle speed sensor 15 and the shift position sensor 16, the second solenoid valve 5 is kept at "ON" condition together with the first solenoid valve 81. So a controlling pressure does not operate on the controlling port q of the reverse inhibit valve 9. At this state the hydraulic pressure does not operate on the port a2, because the shift lever is at a reverse range, however, the reverse inhibit valve 9 is kept at the right-half position, by a move of the spool 9a only by a pressing force of the spring 13. By this action the port r and the port m do not connect and also the hydraulic pressure of a port d of the manual valve 6 is not led to either the hydraulic pressure servo B3 or C2. As a result the output shaft 27 rotates positively.

A modified embodiment will be shown along with FIG. 1.

The second solenoid valve 5 connects to the control chamber o of the shift valve 2, the control chamber n of the 3-4 shift valve 4 and a port A of a reverse inhibit valve 9'. The solenoid valve 5 is connected to the control unit C in order to receive signals from the control unit C based on sensing a shift position and the vehicle speed V by the shift position 16 and the vehicle speed sensor 15. The control unit C, when the vehicle speed servo 15 is sensing under 7 km/h, and at the same time when sensing the "ON" condition of the second solenoid valve 5 continuously for a required moment, signals are sent in order to operate an alarming device 17 to send an emergency signal.

The reverse inhibit valve 9' has a spool 9'a whose one side edge receives a spring 19 and has a controlling oil chamber 9'b leading a hydraulic pressure from a port A. Furthermore, the port B1 of the reverse inhibit valve 9' moves the spool 9'a together with a pressing force of the spring 19, as the control pressure is led to the port A. And when the valve 9' is at the right-half position the port B1 connects to a port E and leads a hydraulic pressure supplied from the port d through the oil passage t to a hydraulic pressure servo B3 for the 1st & Rev. brake through the oil passage u and a check ball 10. Then the port B1 leads to a servo C2 for the direct clutch through the check ball 12. At the other edge of the spool 9'a, as the outer diameter of a land 9'c is formed larger than the outer diameter of a land 9'd, if the spool 9'a is kept at the right-half position only by a pressing force of the spring 19, and if the hydraulic pressure operates on the port B2, the spool 9'a moves and is kept at a left-hand position, so that the oil passages t and u are isolated. At this state when a hydraulic pressure operates on the port A, the hydraulic pressure which is led to the control chamber 9'b and the pressing force of the spring 19 simultaneously overcome the spool pressing force generated by the pressure from the port B, so that the spool 9'a is moved and kept at the right-half position.

Therefore, for example, at forward running of D range a solenoid valve 5 is switched either from "ON" to "OFF" or from "OFF" to "ON", however, the hydraulic pressure from the reverse range port d of the manual valve 6 does not operate on the land differential part of the spool 9'a, the reverse inhibit valve 9' is kept at the left-hand position with no regard to supplying and draining of the controlling oil pressure by the switching of the solenoid valve 5.

When operating the manual valve 6 to the reverse range with the condition that the vehicle speed is under 7 km/h at forward running, as the second solenoid valve 5 is kept "OFF" by the signal from the control unit C, the control pressure operates on the control chamber 9'b to move the spool 9' and the reverse inhibit valve is kept at the right-half position. By this action the oil passages t and u are connected. Then the hydraulic pressure is led to the hydraulic pressure servo B3 for the 1st & Rev. brake through the check ball 10 and to the servo C2 for the direct clutch through the check ball 12. Therefore the 1st & Rev., brake B3 and the output shaft 27 rotates reversely.

Furthermore when the vehicle speed V of forward running is above 7 km/h and the manual valve 6 is operated to the reverse range, the second solenoid valve 5 is switched "ON" by the signal from the control unit C. So the hydraulic pressure does not operate on the control chamber 9'b of the reverse inhibit valve 9'. Therefore at this state even if the manual valve is mistakenly shifted to the reverse range, the spool 9'a moves by the hydraulic pressure supplied from the port d to the port B, so that the reverse inhibit valve 9' is kept at the left-half position. As a result the oil passages t and u are interrupted so the hydraulic pressure does not operate either on the hydraulic pressure servo C2 for the clutch. Therefore the planetary transmission gear mechanism 1 is not switched to reverse running condition.

While, the vehicle speed sensor 15 is sensing the speed under 7 km/h, the alarming device 17 operates by the signals from the control unit C, when the "ON"-condition of the second solenoid valve 5 is sensed continuously for a certain moment. So the open-condition of the second solenoid valve 5 caused by short-circuit and so on can be found immediately.

TECHNICAL ADVANTAGES OF THE INVENTION

As has been explained above, between the oil passage (t) and (u) which connect the reverse range port (d) and the hydraulic servo (C2) the reverse inhibit valve (9) or (9') is arranged. The reverse inhibit valve (9), (9') is designed to connect only when the manual valve (6) is at a reverse range (R) and the control pressure of the solenoid valve (5) is operating. So the solenoid valve (5) which controls the shift valves (2) and (4) can also be used for this purpose, and there is no need to provide another solenoid valve for such purpose. Therefore, the automatic transmission (7) designed to reliably prevent reverse engagement at forward running, can be produced at low cost without using too many expensive solenoid valves. Furthermore, by operating the reverse inhibit valve (9), (9') at the required moment a reliable reverse engage preventing device which positively minimizes the occurrence of valve-stick can be provided.

What is claimed is:

1. A hydraulic control device for an automatic transmission including;

a transmission gear mechanism through which power is transmitted in respective one of power transmitting paths defined therethrough, a plurality of frictional engaging means operatively connected to the transmission gear mechanism for selecting the power transmitting path through which power is transmitted in the transmission gear mechanism depending on running conditions including a reverse running condition, a plurality of hydraulic servos operatively connected to the frictional engaging means for operating or releasing, or, for engaging or disengaging said frictional engaging means, a plurality of shift valves operatively hydraulically communicating with said hydraulic servos and a source of line pressure, a plurality of solenoid valves controlling said shift valves, a manual valve capable of setting a plurality of ranges including a range for reverse running, said hydraulic control device for an transmission comprising:

said manual valve including a reverse range port supplied with a line pressure from a pressure source at reverse operation, and a D-range port supplied with a line pressure from said pressure source at a normal forward running condition, a reverse inhibit valve including;
  a spool,
  a input port communicating with said reverse range port,
  an output port communicating with (a) hydraulic servo(s) (single or plural), among said plural hydraulic servos, to operate (a) frictional engaging element(s) (single or plural) engaged in reverse running condition,
  a first control chamber communicating with a predetermined solenoid valve among said plural solenoid valves and presses said spool toward one direction,
  a second control chamber communicating with said reverse range port of said manual valve and disposed against said first control chamber to counter-operate said spool, said reverse inhibit valve holds said spool at a position where said input port and said output port are through based on said second control chamber being supplied with a line pressure from said reverse range port, said reverse inhibit valve holds said spool at a position where said input port and said output port are disconnected by supplying a control pressure from a predetermined solenoid valve among said plural solenoid valves in case said manual valve is at the reverse operation and a vehicle is running at a predetermined speed.

2. A hydraulic control device for an automatic transmission according to claim 1, wherein said reverse inhibit valve includes a spring in said first control chamber, and said input port and said output port of said reverse inhibit valve are fixed to connect in case second control chamber is not supplied with a line pressure from said reverse range port of said manual valve, or a forward running condition.

3. A hydraulic control device for an automatic transmission according to claim 1, wherein among said plural shift valves, predetermined shift valves controlled by said predetermined solenoid valve are a 1-2 shift valve shifting a first speed condition and a second speed condition of said transmission gear mechanism and a 3-4 shift valve shifting a third speed condition and a fourth speed condition of said transmission gear mechanism.

4. A hydraulic control device for an automatic transmission according to claim 1, wherein said hydraulic servo to operate said frictional engaging element which is engaged in reverse running condition is a hydraulic servo for a direct clutch which is engaged at a direct coupling condition and a reverse running condition of said transmission gear mechanism.

5. A hydraulic control device for an automatic transmission according to claim 1, wherein said hydraulic servo to operate said frictional engaging element which is engaged in reverse running condition is a hydraulic servo for a first & reverse brake which is engaged at a first speed condition and a reverse running condition of said transmission gear mechanism.

6. A hydraulic control device for an automatic transmission according to claim 1, wherein said hydraulic servos to operate said frictional engaging elements which are engaged in reverse running condition are a hydraulic servo for a direct clutch which is engaged at a direct coupling condition and a reverse running condition and a hydraulic servo for a first & reverse brake which is engaged at a first speed condition and a reverse running condition.

7. A hydraulic control device for an automatic transmission according to claim 1, wherein said predetermined solenoid valve which supplies control pressure to said first control chamber of said reverse inhibit valve is operatively connected to a control unit to which predetermined sensors and a alarming device are connected.

8. A hydraulic control device for an automatic transmission according to claim 7, wherein said predetermined sensors are a sensor to detect car speed and a sensor to detect a shift position of said manual valve.

9. A hydraulic control device for an automatic transmission according to claim 8, wherein in case said sensor to detect car speed detects a speed lower than said predetermined speed and said control unit detects a predetermined state which said input port and said output port of said reverse inhibit valve are disconnected continuously for a predetermined period, said alarming device is actuated by signals sent from said control unit.

10. A hydraulic control device for an automatic transmission according to claim 1, wherein a check ball which supplies a line pressure to said hydraulic servo(s) (single or plural) for said frictional engaging element(s) (single or plural) engaged in reverse running condition from either said output port of said reverse inhibit valve or a predetermined shift valve among said plural shift valves is disposed between said hydraulic servo(s) (single or plural) to operate said frictional engaging element(s) (single or plural) engaged in reverse running condition and said reverse inhibit valve.

11. A hydraulic control device for an automatic transmission including;

a transmission gear mechanism through which power is transmitted in respective one of power transmitting paths defined therethrough, a plurality of frictional engaging means operatively connected to the transmission gear mechanism for selecting the power transmitting path through which power is transmitted in the transmission gear mechanism depending on running conditions including a reverse running condition, a plurality of hydraulic servos operatively connected to the frictional engaging means for operating or releasing, or, for engaging or disengaging said frictional engaging means, a plurality of shift valves operatively hydraulically communicating with said hydraulic servos and a source of line pressure, a plurality of solenoid valves controlling said shift valves, a manual valve capable of setting a plurality of ranges including a reverse running condition, said hydraulic control device for an transmission comprising:

said manual valve including a reverse range port supplied with a line pressure from a pressure source at reverse operation, and a D-range port supplied with a line pressure from said pressure source at a normal forward running condition, a reverse inhibit valve including;
  a spool,
  a input port communicating with said reverse range port,
  an output port communicating with (a) hydraulic servo(s) (single or plural), among said plural hydraulic servos, to operate (a) frictional engaging element(s) (single or plural) engaged in reverse running condition,
  a first control chamber communicating with said D-range port of said manual valve and presses said spool toward one direction,
  a second control chamber communicating with a predetermined solenoid valve among said plural solenoid valves and disposed against said first control chamber to counter-operate said spool, said reverse inhibit valve holds said spool at a position where said input port and said output port are through based on said first control chamber being released from a line pressure from said D-range of said manual valve, said reverse inhibit valve holds said spool at a position where said input port and said output port are disconnected by supplying a control pressure from a predetermined solenoid valve among said plural solenoid valves to said second control chamber in case said manual valve is at the reverse operation and a vehicle is running at a predetermined speed.

12. A hydraulic control device for an automatic transmission according to claim 11, wherein said reverse inhibit valve includes a spring in said first control chamber, and said input port and said output port of said reverse inhibit valve are fixed to disconnect in case said first control chamber is not supplied with a line pressure from said D-range port of said manual valve, or a forward running condition.

13. A hydraulic control device for an automatic transmission according to claim 11, wherein among said plural shift valves, predetermined shift valves controlled by said predetermined solenoid valve are a 1-2 shift valve shifting a first speed condition and a second speed condition of said transmission gear mechanism and a 3-4 shift valve shifting a third speed condition and a fourth speed condition of said transmission gear mechanism.

14. A hydraulic control device for an automatic transmission according to claim 11, wherein said hydraulic servo to operate said frictional engaging element which is engaged in reverse running condition is a hydraulic servo for a direct clutch which is engaged at a direct coupling condition and a reverse running condition of said transmission gear mechanism.

15. A hydraulic control device for an automatic transmission according to claim 11, wherein said hydraulic servo to operate said frictional engaging element which is engaged in reverse running condition is a hydraulic servo for a first & reverse brake which is engaged at a first speed condition and a reverse running condition of said transmission gear mechanism.

16. A hydraulic control device for an automatic transmission according to claim 11, wherein said hydraulic servos to operate said frictional engaging elements which are engaged in reverse running condition are a hydraulic servo for a direct clutch which is engaged at a direct coupling condition and a reverse running condition and a hydraulic servo for a first & reverse brake which is engaged at a first speed condition and a reverse running condition.

17. A hydraulic control device for an automatic transmission according to claim 11, wherein said predetermined solenoid valve which supplies control pressure to said second control chamber of said reverse inhibit valve is operatively connected to a control unit to which predetermined sensors and a alarming device are operatively connected.

18. A hydraulic control device for an automatic transmission according to claim 17, wherein said predetermined sensors are a sensor to detect car speed and a sensor to detect a shift position of said manual valve.

19. A hydraulic control device for an automatic transmission according to claim 18, wherein in case said sensor to detect car speed detects a speed lower than said predetermined speed and said control unit detects a predetermined state which said input port and said output port of said reverse inhibit valve are disconnected continuously for a predetermined period, said alarming device is actuated by signals sent from said control unit.

20. A hydraulic control device for an automatic transmission according to claim 11, wherein a check ball which supplies a line pressure to said hydraulic servo(s) (single or plural) for said frictional engaging element(s) (single or plural) engaged in reverse running condition from either said output port of said reverse inhibit valve or a predetermined shift valve among said plural shift valves is disposed between said hydraulic servo(s) (single or plural) to operate said frictional engaging element(s) (single or plural) engaged in reverse running condition and said reverse inhibit valve.

* * * * *

UNITED STATES PATENT AND TRADEMARK OFFICE
CERTIFICATE OF CORRECTION

PATENT NO. : 5,074,168

DATED : December 24, 1991

INVENTOR(S) : Ishikawa et al

Page 1 of 2

It is certified that error appears in the above-indentified patent and that said Letters Patent is hereby corrected as shown below:

Column 12         Please add the following new claims:

21. The hydraulic control system of claim 1 wherein the output from said one solenoid valve is split into a first path providing control pressure to at least one of said shift valves and a second path providing said communication with said first control chamber.

22. The hydraulic control system of claim 11, wherein the output from said one solenoid valve is split int a first path providing control pressure to at least one of said shift valves and a second path providing said communication with said first control chamber.

23. The hydraulic control system of claim 3, wherein the output from said one solenoid valve is split int a first path providing control pressure to said 1-2 shift valve and said 3-4 shift valve and a second path providing said communication with said first control chamber.

UNITED STATES PATENT AND TRADEMARK OFFICE
CERTIFICATE OF CORRECTION

PATENT NO. : 5,074,168   Page 2 of 2
DATED : December 24, 1991
INVENTOR(S) : Ishikawa et al It is certified that error appears in the above-indentified patent and that said Letters Patent is hereby corrected as shown below:

24. The hydraulic control system of claim 13, wherein the output from said one solenoid valve is split into a first path providing control pressure to said 1-2 shift valve an said 3-4 shift valve and a second path providing said communication with said first control chamber. --

Signed and Sealed this

Twenty-sixth Day of October, 1993

Attest:

BRUCE LEHMAN

Attesting Officer    Commissioner of Patents and Trademarks